(12) United States Patent
Chen et al.

(10) Patent No.: US 11,315,312 B2
(45) Date of Patent: Apr. 26, 2022

(54) DISPLAY CABINET AND CONTROL METHOD OF THE SAME

(71) Applicant: BOE TECHNOLOGY GROUP CO., LTD., Beijing (CN)

(72) Inventors: Tieli Chen, Beijing (CN); Yao Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 222 days.

(21) Appl. No.: 16/527,720

(22) Filed: Jul. 31, 2019

(65) Prior Publication Data

US 2020/0211274 A1     Jul. 2, 2020

(30) Foreign Application Priority Data

Jan. 2, 2019  (CN) .......................... 201910000993.5

(51) Int. Cl.
*G06T 17/00* (2006.01)
*G06F 3/041* (2006.01)
(Continued)

(52) U.S. Cl.
CPC ............... *G06T 17/00* (2013.01); *A47F 3/08* (2013.01); *G06F 3/013* (2013.01); *G06F 3/041* (2013.01);
(Continued)

(58) Field of Classification Search
CPC . G06T 17/00; A47F 3/08; G06F 3/013; G06F 3/041; G06F 3/04815; G06F 3/04845; G06F 3/14; G06F 9/4418; H04N 5/247
See application file for complete search history.

(56) References Cited

U.S. PATENT DOCUMENTS 8,241,124 B2* 8/2012 Kelly .................. G07F 17/3202
                                                  463/34
2012/0020548 A1* 1/2012 Kao ..................... H04N 13/261
                                                  382/154
(Continued)

FOREIGN PATENT DOCUMENTS

CN       103324855 A      9/2013
CN       203350837 U     12/2013
(Continued)

OTHER PUBLICATIONS

Office Action for CN Appl. No. 201910000993.5, dated Mar. 4, 2020.

*Primary Examiner* — Ricardo Osorio
(74) *Attorney, Agent, or Firm* — The Webb Law Firm

(57) ABSTRACT

The disclosure provides a display cabinet and a control method thereof. The display cabinet comprises a cabinet body which defines an exhibition space, the display cabinet further comprises: a rotatable tray arranged in the exhibition space, which is configured to place an exhibit; a first camera located in the exhibition space, which is configured to capture images of the exhibit at different angles to construct a 3D model of the exhibit; a transparent touch display constituting at least a portion of the cabinet body, which is configured to display the 3D model when the transparent touch display screen is in an awake state, and acquiring a touch operation and displaying a detailed information of the exhibit according to the touch operation.

16 Claims, 3 Drawing Sheets

(51) Int. Cl.
*G06F 3/0481* (2013.01)
*G06F 3/0484* (2013.01)
*A47F 3/08* (2006.01)
*G06F 3/01* (2006.01)
*G06F 3/04815* (2022.01)
*G06F 3/04845* (2022.01)
*G06F 3/14* (2006.01)
*G06F 9/4401* (2018.01)
*H04N 5/247* (2006.01)

(52) U.S. Cl.
CPC ...... *G06F 3/04815* (2013.01); *G06F 3/04845* (2013.01); *G06F 3/14* (2013.01); *G06F 9/4418* (2013.01); *H04N 5/247* (2013.01)

(56) References Cited

U.S. PATENT DOCUMENTS

| | | | |
|---|---|---|---|
| 2013/0128010 A1* | 5/2013 | Kim | G03B 35/04 348/50 |
| 2016/0095452 A1* | 4/2016 | Turhal | A47F 5/025 312/125 |
| 2017/0115845 A1 | 4/2017 | Shin et al. | |
| 2017/0352127 A1 | 12/2017 | Becker et al. | |
| 2019/0222828 A1* | 7/2019 | Salvador | H04N 13/398 |

FOREIGN PATENT DOCUMENTS

| | | |
|---|---|---|
| CN | 103689955 A | 4/2014 |
| CN | 203931404 U | 11/2014 |
| CN | 204192153 U | 3/2015 |
| CN | 107610169 A | 1/2018 |
| CN | 107864267 A | 3/2018 |
| CN | 207870672 U | 9/2018 |

* cited by examiner

DISPLAY CABINET AND CONTROL METHOD OF THE SAME

CROSS REFERENCE TO RELATED APPLICATIONS

This application claims priority to Chinese Patent Application No. 201910000993.5, filed on Jan. 2, 2019, the disclosure of which is incorporated herein in its entirety by reference.

TECHNICAL FIELD

The present disclosure relates to the field of a display cabinet and a control method thereof.

BACKGROUND

Display cabinets are widely used nowadays, mainly for displaying exhibits (such as in museums and shopping malls). Traditional transparent display cabinets can only display items. With the exhibits statically placed in the display cabinets, customers cannot watch the exhibits from various angles. In general, valuable exhibits such as antiques, cultural relics, jewelry and so on are not suitable for viewing by people outside the display cabinets. In this case, it is not possible for the people to get all the information about the exhibits by simply viewing the exhibits. In addition, although there are already applications in the market where transparent interactive screens are embedded into the display cabinets, displaying the exhibits on the screens in the form of still pictures or texts cannot bring a better interactive experience.

At present, the best interactive experience is to present 3D models of the exhibits on a transparent screen, so that visitors can directly view the exhibits at different angles. However, if it is desired to display the exhibits with the 3D models, one way is to hand over the exhibition items to some professionals for modeling. For valuable items such as cultural relics, luxury goods, jewelry and so on, there is a great risk during the transportation. Another way is to use a 3D camera to obtain the 3D models, but the cost will be higher.

Therefore, further research is needed on the display cabinets that can display the 3D models of the exhibits.

SUMMARY

In one aspect of the disclosure, the present disclosure provides a display cabinet comprising a cabinet body which defines an exhibition space. According to embodiments of the present disclosure, the display cabinet comprises: a rotatable tray arranged in the exhibition space, which is configured to place an exhibit; a first camera located in the exhibition space, which is configured to capture images of the exhibit at different angles to construct a 3D model of the exhibit; and a transparent touch display screen constituting at least a portion of the cabinet body, which is configured to display the 3D model when the transparent touch display screen is in an awake state, and acquiring a touch operation and displaying a detailed information of the exhibit according to the touch operation.

According to the embodiments of the present disclosure, the display cabinet further comprises: a second camera arranged on the cabinet body; a microprocessor electrically connected to the second camera and the transparent touch display screen; wherein the second camera is configured to identify a visitor, and the microprocessor is configured to calculate a distance between the visitor and the display cabinet; if the distance between the visitor and the display cabinet is less than or equal to a predetermined distance, the microprocessor controls the transparent touch display screen to be in the awake state; otherwise the microprocessor controls the transparent touch display screen to be in a sleep state.

According to the embodiments of the present disclosure, the microprocessor is further configured to calculate a period during which human eyes gaze at the display cabinet; if the distance between the visitor and the display cabinet is less than or equal to the predetermined distance, and the period during which the human eyes gaze at the display cabinet is greater than or equal to a predetermined period, the microprocessor controls the transparent touch display screen to be in the awake state; otherwise the microprocessor controls the transparent touch display screen to be in the sleep state.

According to the embodiments of the present disclosure, the predetermined distance is 1 to 1.5 meters, and the predetermined period is 3 to 5 seconds.

According to the embodiments of the present disclosure, the display cabinet further comprises a storage space arranged on a side of the rotatable tray away from the exhibit, the storage space being provided with a stepping motor and a micro-control unit, wherein the stepping motor is configured to drive the rotatable tray to rotate, and the micro-control unit is electrically connected to the stepping motor, which is configured to control a rotation angle of the rotatable tray.

According to the embodiments of the present disclosure, the display cabinet further comprises an angular velocity sensor arranged on a side of the rotatable tray away from the exhibit, which is configured to monitor the rotation angle of the rotatable tray.

According to the embodiments of the present disclosure, the display cabinet further comprises a controller which is configured to control the rotatable tray, the first camera, the transparent touch display screen and the second camera to perform respective operations according to the touch operation, wherein the controller controls the rotatable tray to rotate a corresponding angle according to a mapping relationship between a rotation touch operation and the rotatable tray when the touch operation is the rotation touch operation.

According to the embodiments of the present disclosure, the controller comprises: a system board which runs an operating system and has an application installed thereon, the application configured to control the transparent touch display screen to display the detailed information of the exhibit and/or controlling a rotation angle of the rotatable tray according to the touch operation According to the embodiments of the present disclosure, the images of the exhibit at different angles captured by the first camera are transmitted to a server which is configured to construct the 3D model according to the images of the exhibit at different angles.

In another aspect of the present disclosure, this disclosure provides a method of controlling the display cabinet as described above. According to embodiments of the present disclosure, the method comprises: displaying a 3D model of an exhibit when a transparent touch display screen is in an awake state, and acquiring a touch operation through the transparent touch display screen and displaying a detailed information of the exhibit according to the touch operation; wherein the 3D model is constructed and obtained by using a first camera to capture images of the exhibit at different angles.

According to the embodiments of the present disclosure, the method is performed by a controller; if it is selected through the transparent touch display screen to model the exhibit, the controller controls the rotatable tray to rotate a circle while it controls the first camera to capture the images of the exhibit every a predetermined rotation angle; a system board of the controller transmits the images of the exhibit at different angles captured by the first camera to the server; the server constructs the 3D model of the exhibit according to the obtained images of the exhibit at different angles, and transmits the 3D model to the system board of the controller; the system board controls the transparent touch display screen to display the 3D model.

According to the embodiments of the present disclosure, when the transparent touch display screen displays the 3D model, the method further comprises performing at least one of dragging, scaling and rotating of the 3D model by touching the transparent touch display screen.

According to the embodiments of the present disclosure, when the rotating of the 3D model is performed, the controller controls the rotatable tray to rotate such that an exhibition angle of the exhibit is the same as an exhibition angle of the 3D model.

According to the embodiments of the present disclosure, when the touch operation is a rotation touch operation, the controller controls the rotatable tray to rotate a corresponding angle according to a mapping relationship between the rotation touch operation and the rotatable tray.

According to the embodiments of the present disclosure, the method further comprises: monitoring an actual rotation angle of the rotatable tray in real time using an angular velocity sensor; if the actual rotation angle is inconsistent with a theoretical angle, controlling, by the micro-control unit, the rotatable tray to rotate again until the actual rotation angle coincides with the theoretical angle.

According to the embodiments of the present disclosure, the method further comprises: identifying a visitor using a second camera; calculating a distance between the visitor and the display cabinet using a microprocessor; if the distance between the visitor and the display cabinet is less than or equal to a predetermined distance, controlling, by the microprocessor, the transparent touch display screen to be in the awake state; otherwise controlling, by the microprocessor, the transparent touch display screen to be in a sleep state.

According to the embodiments of the present disclosure, the method further comprises: calculating a period during which human eyes gaze at the display cabinet; if the distance between the visitor and the display cabinet is less than or equal to the predetermined distance, and the period during which the human eyes gaze at the display cabinet is greater than or equal to a predetermined period, controlling, by the microprocessor, the transparent touch display screen to be in the awake state; otherwise controlling, by the microprocessor, the transparent touch display screen to be in the sleep state.

According to the embodiments of the present disclosure, the method further comprises: recording, by the microprocessor, visitor information according to capturing of the second camera, the visitor information including a number of visitors and a length of time of attention to the exhibit.

DETAILED DESCRIPTION

Figure 1:
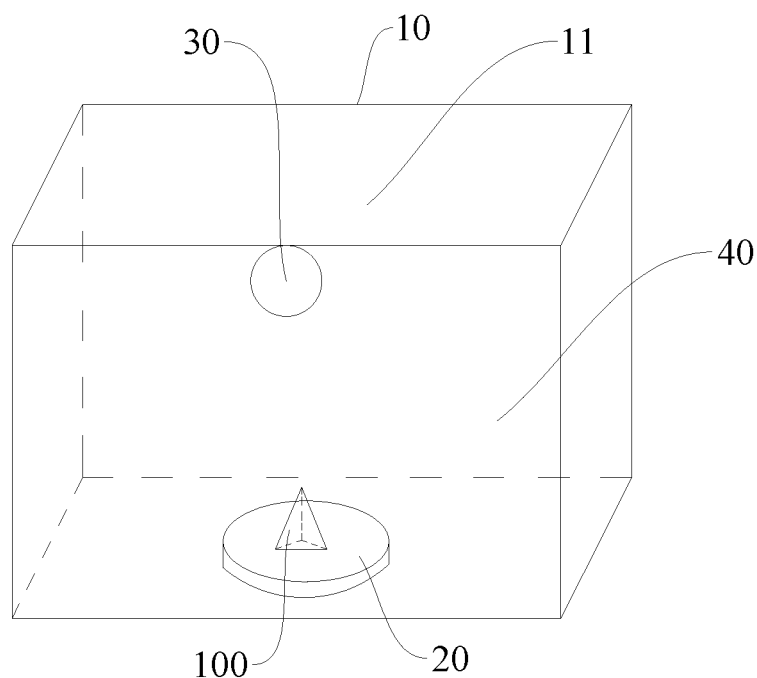
FIG. 1 is a schematic perspective view of a display cabinet according to embodiments of the present disclosure.

Embodiments of the present disclosure will be described below in detail. The embodiments described below are illustrative, which are merely used to explain the present disclosure, but cannot be understood as limitation to the present disclosure. For the specific techniques or conditions not specified in the embodiments, they are carried out according to the techniques or conditions described in the literature in the field or according to the product specifications.

The present disclosure aims to solve at least one of the technical problems in the related art to some extent. In view of this, an object of the present disclosure is to provide a display cabinet that can display a 3D model of an exhibit without a 3D camera. The display cabinet does not require professional modeling software or professional operations locally, so that the risk of damage to the exhibit can be avoided. Moreover, the display cabinet does not need to be locally provided with a high-performance board for image processing, thereby the cost can be greatly reduced.

The display cabinet according to the embodiments of the disclosure can display the 3D model of the exhibit in a simple and fast manner to facilitate visitors to view and understand the exhibit in all aspects. Moreover, the display cabinet of the present disclosure can obtain the 3D model of the exhibit without using the 3D camera or performing the modeling by professional modeling software and professionals. Therefore, not only the cost of obtaining the 3D model can be reduced, but also the risk of damage to the exhibit in 3D modeling of the exhibit can be avoided, and thus the original appearance of the exhibit can be better protected.

The method of controlling the display cabinet according to the embodiments of the disclosure is simple and easy to implement. When viewing the 3D model of the exhibit, the visitor can directly perform a touch operation on the transparent touch display screen. The 3D model is directly constructed from images of the exhibit at different angles that are captured by the first camera to facilitate visitors to view and understand the exhibit in all aspects. Moreover, the display cabinet of the present disclosure can obtain the 3D model of the exhibit without using the 3D camera or performing the modeling by professional modeling software and professionals. Therefore, not only the cost of obtaining the 3D model can be reduced, but also the risk of damage to the exhibit in 3D modeling of the exhibit can be avoided, and thus the original appearance of the exhibit can be better protected.

In one aspect of the disclosure, the present disclosure provides a display cabinet. According to the embodiments of this disclosure, referring to FIG. 1 and FIG. 2 (which is a cross-sectional view of FIG. 1, and in which a transparent touch display screen 40 is not shown), the display cabinet comprises a cabinet body 10 which defines an exhibition space 11, the display cabinet further comprising: a rotatable tray 20 arranged in the exhibition space 11, which is configured to place an exhibit 100; a first camera 30 located in the exhibition space 11, which is configured to capture images of the exhibit 100 at different angles to construct a 3D model of the exhibit; a transparent touch display screen 40 constituting at least a portion of the cabinet body 10, which is configured to display the 3D model when the transparent touch display screen 40 is in an awake state, and acquiring a touch operation and displaying a detailed information of the exhibit 100 according to the touch operation. In this way, the display cabinet as described above can display the 3D model of the exhibit in a simple and fast manner to facilitate the visitors to view and understand the exhibit in all aspects. Moreover, the display cabinet of the present disclosure can obtain the 3D model of the exhibit without using the 3D camera or performing the modeling by professional modeling software and professionals. Therefore, not only the cost of obtaining the 3D model can be reduced, but also the risk of damage to the exhibit in 3D modeling of the exhibit can be avoided, and thus the original appearance of the exhibit can be better protected.

According to the embodiments of the present disclosure, in order to improve the brightness of the exhibit and facilitate the capturing of the first camera, a light source may be further arranged in the exhibition space. There is no limitation on the specific location of the light source, and those skilled in the art may flexibly select its position according to actual needs, as long as the exhibit can be illuminated without affecting the capturing of the first camera.

Figure 2:
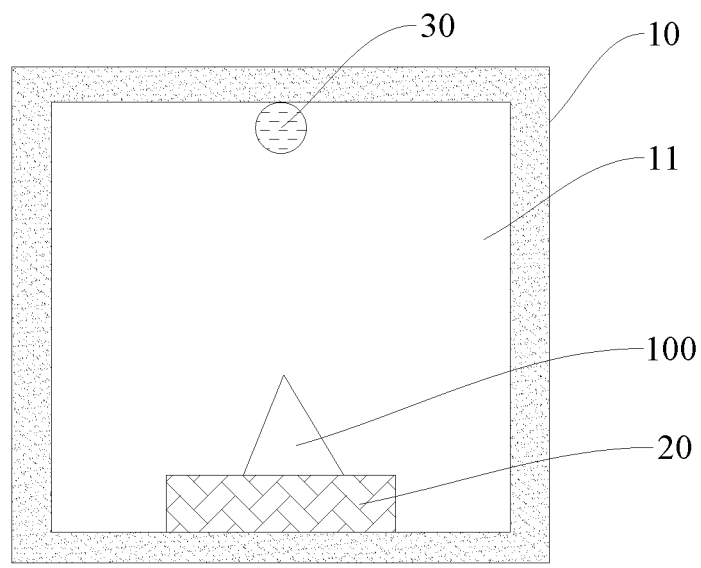
FIG. 2 is a schematic cross-sectional view of FIG. 1 of the present disclosure.

According to the embodiments of the present disclosure, there is no limitation on the structure of the cabinet body, and those skilled in the art can flexibly design the appearance and the shape of the cabinet body according to actual needs, such as the shape and the appearance of the exhibit, personalized design requirements or the like. In some embodiments of the present disclosure, it may be a cube shape as shown in FIG. 1; in other embodiments of the present disclosure, the structure of the cabinet body may be a cylindrical, spherical, wavy, or any other shape.

According to the embodiments of the present disclosure, there is no limitation on the transparency of other portions of the cabinet body than the transparent touch display screen. Since the display cabinet can display a 3D model of the exhibit, there is no specific limitation on the transparency of other portions of the cabinet body than the transparent touch display screen, for example, these portions may be transparent, translucent or opaque, which will not be limited herein. According to the embodiments of the present disclosure, there is no limitation on the specific material of other portions of the cabinet body than the transparent touch display screen, and materials of conventional display cabinets can be adopted by those skilled in the art.

According to the embodiments of the present disclosure, as described above, the first camera 30 is arranged in the exhibition space 11, and there is no limitation on its arrangement position. The person skilled in the art can flexibly specify the specific position of the first camera 30 according to the shape and the size of the specific exhibit, as long as the exhibit can be fully captured. For example, the first camera 30 can be arranged on a top wall of the cabinet body or on a side wall of the cabinet body.

According to the embodiments of the present disclosure, as described above, the transparent touch display screen 40 constitutes at least a portion of the cabinet body, and specifically, to which portion of the cabinet body it belongs is not limited, and which can be flexibly designed by those skilled in the art according to actual needs such as the shape and the size of the display cabinet. In some embodiments of the present disclosure, if the display cabinet is relatively small, the person skilled in the art can take the transparent touch display screen 40 as the top wall of the cabinet body; if the display cabinet is relatively large, the person skilled in the art can take the transparent touch display screen 40 as a portion of the side wall of the cabinet body. Thereby, this makes it easier for the visitors to view the exhibit.

According to the embodiments of the present disclosure, the display cabinet further comprises a controller which is configured to control the rotatable tray, the first camera, the transparent touch display screen according to a touch operation. Thereby, the rotation of the rotatable tray, the capturing of the first camera, and the display on the touch display screen can be conveniently implemented.

According to the embodiments of the present disclosure, in order to implement the function of the controller, the controller comprises a system board which runs an operating system and has an application installed thereon, the application configured to control the transparent touch display screen to display the detailed information of the exhibit and/or controlling a rotation angle of the rotatable tray according to the touch operation. Thereby, it is possible to control the various touch operations on the display cabinet very well, and the automation degree of the display cabinet can be improved.

According to the embodiments of the present disclosure, the images of the exhibit at different angles captured by the first camera are transmitted to a server which is configured to construct the 3D model according to the images of the exhibit at different angles. Therefore, a large amount of operations involved in establishing the 3D model are completed on the server, without the need of providing a high-performance board for the system board, thereby greatly reducing the manufacturing cost of the display cabinet. According to the embodiments of the present disclosure, in order to further reduce the cost, the server may be a cloud server. Thereby, the cost may be further lowered.

Below, in accordance with some embodiments of the present disclosure, a process of displaying a 3D model of an exhibit by the display cabinet will be described in detail.

The system board runs the operating system and has a modeling application installed thereon. If the modeling application is touched on the transparent touch display screen (a modeling touch operation), the modeling application drives the rotatable tray to rotate a circle, while controlling the first camera to capture the images of the exhibit every a predetermined rotation angle, to obtain the images of the exhibit at different angles. Then, the system board transmits the images to the server, the server constructs a 3D model of the exhibit according to the obtained images of the exhibit at different angles, and transmits the 3D model to the system board of the controller. Therefore, the system board can control the transparent touch display screen to display the 3D model. In this way, the images required for 3D modeling in the above process do not need to be captured by a 3D camera, and can be obtained by using a regular 2D camera. Thereby, the cost is reduced. This automated modeling process does not require professional modeling software and professional operations, so that the risk of damage to the exhibit can be avoided. Moreover, the creation of the 3D model is done at the server, and the controller does not need to be provided with a high-performance board for image processing, which in turn can further reduce the cost.

According to the embodiments of the present disclosure, in order to obtain images at different angles and to ensure that each part of the exhibit can be captured, the predetermined angle as described above may be 30° to 35°, such as 30°, 31°, 32°, 33°, 34° or 35°. Thereby, it is possible to capture images of the exhibit at different angles in a more comprehensive manner, thereby improving the accuracy of the obtained 3D model.

Figure 3:
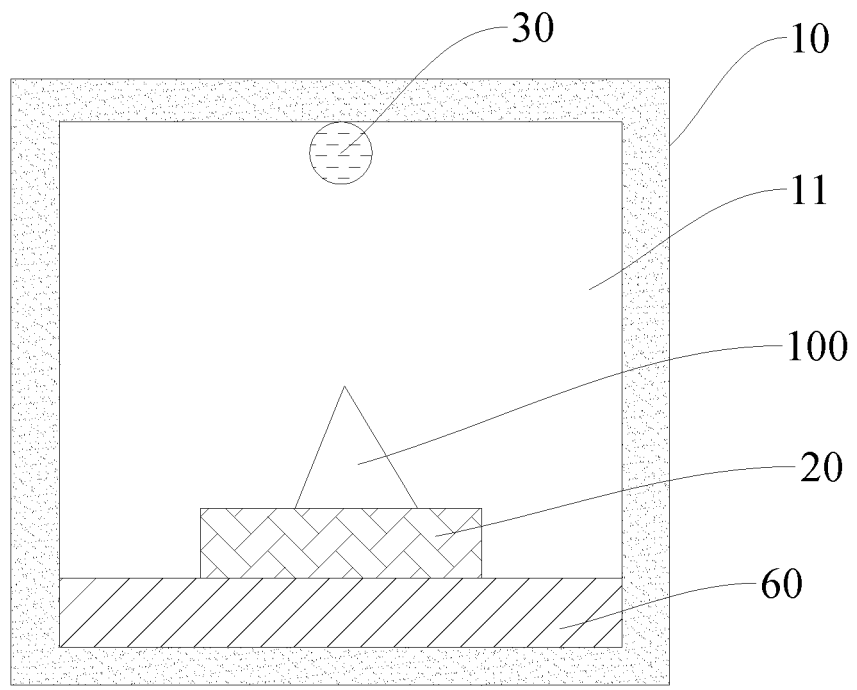
FIG. 3 is a schematic cross-sectional view of a display cabinet according to embodiments of the present disclosure.

According to the embodiments of the present disclosure, in order to drive the rotation of the rotatable tray by the modeling application and to improve neatness of the appearance of the display cabinet, referring to FIG. 3, the display cabinet further comprises a storage space 60 arranged on a side of the rotatable tray away from the exhibit. The storage space 60 is provided with a stepping motor and a micro-control unit (MCU), wherein the stepping motor is configured to drive the rotatable tray to rotate, and the micro-control unit is electrically connected to the stepping motor, which is configured to control a rotation angle of the rotatable tray. Specifically, when the modeling application is touched on the transparent touch display screen, the modeling application transmits an electrical signal for rotating the rotatable tray to the micro-control unit, and the micro-control unit converts the electrical signal into a driving signal for driving the stepper motor to complete the rotation of the rotatable tray, thereby implementing the capturing of the exhibit at different angles. Referring to FIG. 3, the stepping motor and the micro-control unit are arranged in the storage space 60, so that the appearance of the display cabinet can be made neater and more beautiful.

According to the embodiments of the present disclosure, in order to reduce the difficulty of integrating the controller with the micro-control unit, and increase the versatility, the application can communicate with the micro-control unit through a Bluetooth interface (that is, the micro-control unit is electrically connected to a Bluetooth module). That is, the modeling application transmits an electrical signal for rotating the rotatable tray to the micro-control unit via the Bluetooth interface, and the micro-control unit converts the electrical signal into a driving signal to drive the rotatable tray to rotate. Thereby, the difficulty of integrating the controller with the micro-control unit is reduced, and the versatility is increased.

According to the embodiments of the present disclosure, there is no limitation on the operating system installed on the system board. The operating system may be an Android operating system, a Windows operating system, or an Apple operating system, and those skilled in the art may make a flexible choice according to actual needs. According to the embodiments of the present disclosure, in order to make the appearance of the display cabinet neater and more beautiful, the system board and the Bluetooth module may also be arranged in the storage space 60 on a side of the rotatable tray away from the exhibit, as shown in FIG. 3.

According to the embodiments of the present disclosure, the specific method of 3D modeling at the server may comprises: receiving, by the server, the images transmitted from the system board, invoking an algorithm of 3D modeling, inputting the above images into the algorithm, and obtaining an obj-format of 3D model by the algorithm, saving the 3D model on the server and rendering it in a HTML webpage, and then returning the URL of the webpage back to the local (system board), and automatically displaying the 3D model of the exhibit on the transparent touch display screen.

According to the embodiments of the present disclosure, the above 3D modeling algorithm may be a method of structure from motion. Of course, those skilled in the art may also select other modeling algorithms according to actual needs, as long as the exhibit can be 3D modeled at the server, and which is not limited herein.

According to the embodiments of the present disclosure, in order to meet the different needs of different visitors, in addition to obtaining the 3D model of the exhibit, the touch operation can also obtain introduction information of the exhibit and control the rotation of the rotatable tray. Specifically, in the case that a visitor wants to know about a particular introduction of the exhibit (taking a cultural relic as an example, the introduction information may include information such as the historical background, function of the exhibit, its contributions to the historical progress and so on), the introduction information of the exhibit can be obtained by accessing an application of exhibit introduction on the transparent touch display screen. If the visitor does not want to see the 3D model of the exhibit and only wants to see the exhibit at different angles, the rotatable tray can be rotated by a touch operation performed on the transparent touch display screen, that is, an application of exhibit rotation on the transparent touch display screen. The application transmits an electric signal for a necessary rotation angle of the rotatable tray to the micro-control unit via a Bluetooth interface. After receiving the electric signal, the micro-control unit converts the electrical signal into a driving signal that drives the stepping motor to rotate the rotatable tray by a corresponding angle (the corresponding angle is equal to the necessary rotation angle). In this way, the visitor can view the exhibit in various directions and at different angles during the rotation.

According to the embodiments of the present disclosure, in order to make the visitor more convenient to view the exhibit, the above method of acquiring the necessary rotation angle may comprises: after the application of exhibit rotation has been touched, the application can obtain an angle of finger rotation by means of a position sensor on the transparent touch display screen. An electrical signal for the necessary rotation angle of the rotatable tray is obtained by calculating a mapping relationship between the angle of finger rotation and the rotatable tray. Thereby, not only the convenience of viewing, but also the fun of viewing can be increased, and the automation of displaying the exhibit in the display cabinet can be implemented. According to the embodiments of the disclosure, in order to improve the sensitivity of the position sensor, the transparent touch display screen can be a capacitive screen, which has not only high sensitivity, but also lower cost, and its preparation is convenient.

In accordance with the embodiments of the present disclosure, in order to cause the rotatable tray to accurately rotate the necessary rotation angle as described above, the display cabinet further comprises an angular velocity sensor arranged on a side of the rotatable tray away from the exhibit (the angular velocity sensor can be arranged in the storage space), which is configured to monitor the rotation angle of the rotatable tray. Thereby, the angular velocity sensor monitors an actual rotation angle of the rotatable tray in real time when it rotates. If it detects that the actual rotation angle is inconsistent with the necessary rotation angle, the micro-control unit controls the rotatable tray to rotated again until the actual rotation angle coincides with the necessary rotation angle. In this way, a position of the exhibit to be viewed can be located more accurately, and the viewing experience can be improved.

Figure 4:
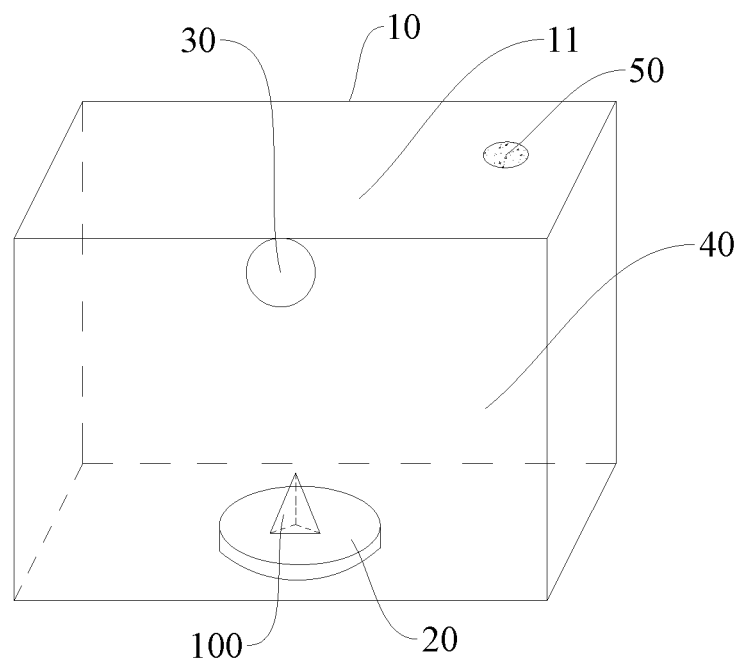
FIG. 4 is a schematic perspective view of a display cabinet according to embodiments of the present disclosure.

According to the embodiments of the present disclosure, in order to further improve the automation of the display cabinet, referring to FIG. 4, the display cabinet further comprises: a second camera 50 arranged on the cabinet body

10; a microprocessor (not shown in the figure) electrically connected to the second camera 50 and the transparent touch display screen 40; wherein the second camera is configured to identify a visitor, and the microprocessor is configured to calculate a distance between the visitor and the display cabinet; if the distance between the visitor and the display cabinet is less than or equal to a predetermined distance, the microprocessor controls the transparent touch display screen to be in an awake state; otherwise the microprocessor controls the transparent touch display screen to be in a sleep state. Thereby, the display cabinet can automatically identify viewers who want to view the exhibit, and quickly wake up the transparent touch display screen, so that not only can the visitors be attracted, but also they do not need to go to the display cabinet to manually wake up the display screen, thereby shortening the time for the visitors to view the exhibit. If the visitors are away from the exhibit, the microprocessor determines that the distance between the visitors and the display cabinet is greater than the predetermined distance through calculation, the transparent touch display screen enters the sleep state, thereby reducing the energy consumption of the display cabinet and extending the service life of the transparent touch display screen.

According to the embodiments of the present disclosure, in order to more accurately identify the visitors who want to view the exhibit, the microprocessor is further configured to calculate a period during which human eyes gaze at the display cabinet. If the distance between the visitor and the display cabinet is less than or equal to the predetermined distance, and the period during which the human eyes gaze at the display cabinet is greater than or equal to the predetermined period, the microprocessor controls the transparent touch display screen to be in the awake state, otherwise the microprocessor controls the transparent touch display screen to be in the sleep state. Those skilled in the art can understand that the above-mentioned "otherwise the microprocessor controls the transparent touch display screen to be in the sleep state" means that as long as one or both of conditions "the distance between the visitor and the display cabinet is less than or equal to the predetermined distance" and "the period during which the human eyes gaze at the display cabinet is greater than or equal to the predetermined period" is not satisfied, the microprocessor controls the transparent touch display screen to be in the sleep state, and only if both of these two conditions "the distance between the visitor and the display cabinet is less than or equal to the predetermined distance" and "the period during which the human eyes gaze at the display cabinet is greater than or equal to the predetermined period" are satisfied, the microprocessor controls the transparent touch display screen to be in the awake state. Thereby, the display cabinet can more accurately identify the viewers who want to view the exhibit.

According to the embodiments of the present disclosure, in order to more accurately identify the viewers who want to view the exhibit, the predetermined distance is 1 to 1.5 m, such as 1 m, 1.1 m, 1.2 m, 1.3 m, 1.4 m, or 1.5 m; the predetermined period is 3 to 5 s, such as 3 s, 3.5 s, 4 s, 4.5 s, or 5 s. In this way, the second camera has higher recognition accuracy. If the predetermined distance is too small or the predetermined period is too long, the recognition of the second camera is relatively slow; if the predetermined distance is too long, or the predetermined period is too short, it is possible that a person who gives the display cabinet a glance in the distance but not intending to view the exhibit may wake up the display screen, so that the energy consumption of the display cabinet may be increased, and the recognition ability of the second camera may be affected.

According to the embodiments of the present disclosure, by the capturing of the second camera, the microprocessor may have a function of recording visitor information, such as a number of visitors, a ratio of male to female, a length of time of attention to the exhibit or the like, and transmitting the recorded visitor information to the server for data analysis and providing big data analysis for managers.

According to the embodiments of the present disclosure, in order to better control the capturing of the second camera, the second camera is also controlled by the controller to perform corresponding operations. Specifically, the second camera is controlled by the system board of the controller to capture the viewers and implement the function of visitor recognition.

According to the embodiments of the present disclosure, there is no limitation on the specific arrangement position of the second camera, as long as the faces of the viewers can be captured. Moreover, the second camera can be arranged outside the cabinet body, and if the cabinet body is a transparent cabinet body, the second camera can be arranged inside the exhibition space. More specifically, in order to accurately recognize the face of the viewer and calculate the distance between the visitor and the cabinet body, the second camera adopts a high-definition camera, to achieve higher definition capturing and more accurate recognition.

According to the embodiments of the present disclosure, there is no limitation on the arrangement position of the microprocessor, and a flexible choice can be made by those skilled in the art according to actual needs. In some embodiments of the present disclosure, the microprocessor is integrally provided with the second camera. Thereby, the structure of the display cabinet can be simplified to make the display cabinet simpler and neater, facilitating the viewers to view the exhibit.

In another aspect of the present disclosure, this disclosure provides a method of controlling the display cabinet as described above. According to the embodiments of the present disclosure, the method comprises: displaying a 3D model of an exhibit when a transparent touch display screen is in an awake state, and acquiring a touch operation through the transparent touch display screen and displaying a detailed information of the exhibit according to the touch operation; wherein the 3D model is constructed and obtained by using a first camera to capture images of the exhibit at different angles.

According to the embodiments of the present disclosure, the method of controlling the display cabinet as described above is simple and easy to implement. When viewing the 3D model of the exhibit, the visitor can directly perform a touch operation on the transparent touch display screen. After the touch operation on the transparent touch display screen is acquired, the first camera begins to capture images of the exhibit at different angles for constructing the 3D model, so that visitors can view and understand the exhibit in all aspects. Moreover, the display cabinet of the present disclosure can obtain the 3D model of the exhibit without using a 3D camera or performing the modeling by professional modeling software and professional staffs. Therefore, not only the cost of obtaining the 3D model can be reduced, but also the risk of damage to the exhibit in 3D modeling of the exhibit can be avoided, and the original appearance of the exhibit can be protected better.

According to the embodiments of the present disclosure, the method is performed by a controller, the controller comprising: a system board which runs an operating system and has an application installed thereon, the application configured to control the transparent touch display screen to display the detailed information of the exhibit and/or controlling a rotation angle of the rotatable tray according to the touch operation; a server for constructing a 3D model of the exhibit according to the images of the exhibit at different angles. Thereby, a large amount of operations involved in establishing the 3D model are completed on the server, without the need of providing a high-performance board for the system board, thereby greatly reducing the manufacturing cost of the display cabinet. If it is selected through the transparent touch display screen to model the exhibit, the controller controls the rotatable tray to rotate a circle while it controls the first camera to capture the images of the exhibit every a predetermined rotation angle; a system board of the controller transmits the images of the exhibit at different angles captured by the first camera to the server; the server constructs the 3D model of the exhibit according to the obtained images of the exhibit at different angles, and transmits the 3D model to the system board of the controller; the system board controls the transparent touch display screen to display the 3D model. Thereby, the rotation of the rotatable tray, the capturing of the first camera, and the display on the touch display screen can be conveniently performed to achieve 3D modeling of the exhibit.

Figure 5:
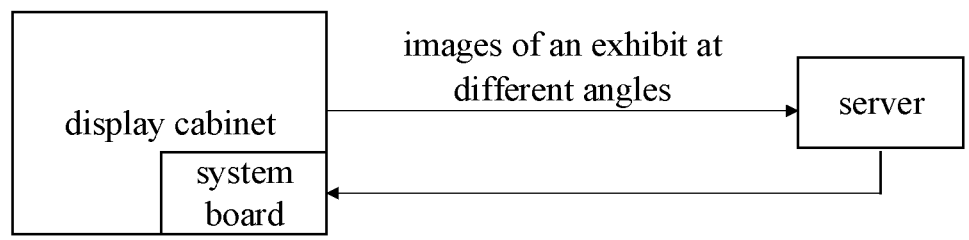
FIG. 5 is a flow chart of performing 3D modeling of an exhibit according to embodiments of the present disclosure.

Below, referring to FIG. 5, a process of displaying a 3D model of an exhibit in the display cabinet in accordance with some embodiments of the present disclosure will be described in detail.

The system board runs an operating system and has a modeling application installed thereon. If the modeling application is touched on the touch display screen (a modeling touch operation), the modeling application drives the rotatable tray to rotate a circle, while controlling the first camera to capture images of the exhibit every a predetermined rotation angle to obtain the images of the exhibit at different angles. Then, the system board transmits the images to the server, which constructs a 3D model of the exhibit according to the obtained images of the exhibit at different angles, and transmits the 3D model to the system board of the controller. The system board receives the 3D model and controls the transparent touch display screen to display the 3D model. In this way, the images required for the 3D modeling in the above process do not need to be captured by a 3D camera, and can be obtained by using a regular 2D camera. Thereby, the cost is reduced. This automated modeling process does not require professional modeling software and professional operations, so that the risk of damage to the exhibit can be avoided. Moreover, the creation of the 3D model is done at the server, and the controller does not need to be provided with a high-performance board for image processing, which in turn can further reduce the cost.

According to the embodiments of the present disclosure, in order to drive the rotation of the rotatable tray by the modeling application, the display cabinet further comprises a stepping motor and a micro-control unit (MCU) arranged on a side of the rotatable tray away from the exhibit, wherein the stepping motor is configured to drive the rotatable tray to rotate, and the micro-control unit is electrically connected with the stepping motor, which is configured to control a rotation angle of the rotatable tray. Specifically, when the modeling application is touched on the transparent touch display screen, the modeling application transmits an electrical signal for rotating the rotatable tray to the micro-control unit, and the micro-control unit converts the electrical signal into a driving signal for driving the stepper motor to complete the rotation of the rotatable tray, thereby capturing the images of the exhibit at different angles.

According to the embodiments of the present disclosure, in order to reduce the difficulty of integrating the controller with the micro-control unit, and increase the versatility, the application can communicate with the micro-control unit via a Bluetooth interface (that is, the micro-control unit is electrically connected to a Bluetooth module). That is, the modeling application transmits an electrical signal for rotating the rotatable tray to the micro-control unit via the Bluetooth interface, and the micro-control unit converts the electrical signal into a driving signal to drive the rotatable tray to rotate. Thereby, the difficulty of integrating the controller with the micro-control unit is reduced, and the versatility is increased.

According to the embodiments of the present disclosure, when the transparent touch display screen displays the 3D model, in order to allow the visitor to freely view the 3D model of the exhibit at any angle, the method of controlling the display cabinet further comprises: performing at least one of dragging, scaling and rotating of the 3D model by touching the transparent touch display screen. Therefore, the need of different visitors to view the exhibit can be satisfied, and it is ensured that the visitors can view any position of the exhibit, enabling the visitor to more comprehensively view and understand the exhibit.

According to the embodiments of the present disclosure, in the process of viewing the exhibit, in order to get a better viewing of the model and the physical object of the exhibit, when the 3D model is rotated, the controller controls the rotatable tray to rotate, so that the exhibition angle of the exhibit is the same as that of the 3D model. In this way, while the viewer is viewing the model of the exhibit at different angles, the visitor can also view the physical object of the exhibit at a corresponding angle of the model, and thus the viewer can observe both the model and the physical object of the exhibit by comparison. Therefore, the visitor can not only interact with the exhibit, but also get an enhanced viewing experience, thereby viewing the exhibit at a closer distance and getting a full understanding of the exhibit.

Figure 6:
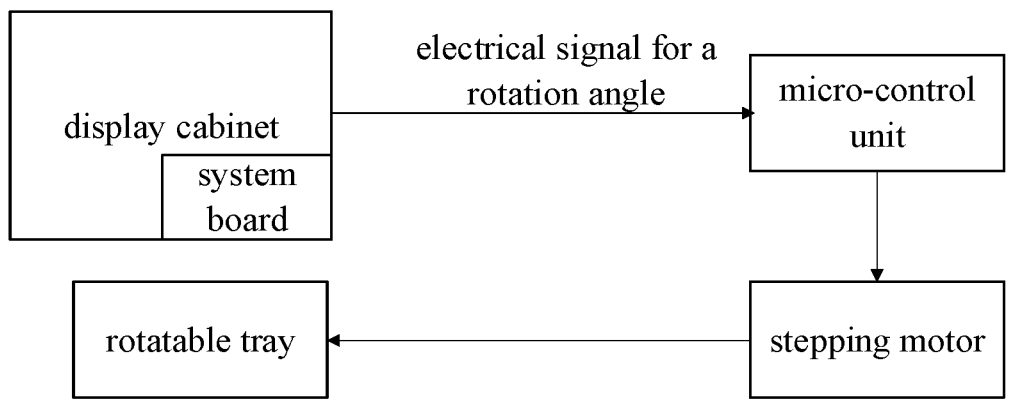
FIG. 6 is a flow chart of driving an exhibit to rotate according to embodiments of the present disclosure.

According to the embodiments of the present disclosure, if a viewer does not want to view the 3D model of the exhibit, but only wants to view the physical object of the exhibit at different angles, a rotary touch operation can be selected, and the controller controls the rotatable tray to rotate by a corresponding angle according to a mapping relationship between the rotary touch operation and the rotatable tray. Specifically, referring to FIG. 6, the rotatable tray can be rotated by a rotary touch operation on the transparent touch display screen (i.e., an application of exhibit rotation on the transparent touch display screen). Then, a finger rotation angle of the touch operation is obtained by means of a position sensor on the transparent touch display screen (such as a capacitive screen), and an electrical signal for a necessary rotation angle of the rotatable tray is obtained by calculating a mapping relationship between the finger rotation angle and the rotatable tray. The application of exhibit rotation transmits the electrical signal for the necessary rotation angle of the rotatable tray to the micro-control unit via a Bluetooth interface. After receiving this electrical signal, the micro-control unit converts the electrical signal into a driving signal to drive the stepping motor to rotate the rotatable tray by a corresponding angle. In this way, the visitor can view the appearance of the physical object of the exhibit from various directions and different angles during the rotation of the exhibit. Moreover, the convenience of viewing and the fun of viewing can be increased, and the automation of displaying the exhibit in the display cabinet can be implemented.

According to the embodiments of the present disclosure, the method further comprises: monitoring an actual rotation angle of the rotatable tray in real time by using an angular velocity sensor; if the actual rotation angle is inconsistent with a theoretical angle, controlling, by the micro-control unit, the rotatable tray to rotate again until the actual rotation angle coincides with the theoretical angle. In this way, the position of the exhibit to be viewed can be located more accurately, and the viewing experience can be improved. It should be noted that the theoretical angle refers to an angle of rotation required during the rotation of the rotatable tray, for example, if the 3D model is rotated while being viewed, the exhibit will also be rotated by the rotatable tray, such that the exhibition angle of the exhibit coincides with the exhibition angle of the 3D model. At this time, the theoretical angle refers to an angle by which the rotating tray needs be rotated in order to make the exhibition angle of the exhibit exactly coincide with the exhibition angle of the 3D model; in the case that the physical object of the exhibit is only viewed by rotating the rotatable tray, the theoretical angle refers to the necessary rotation angle of the rotatable tray that is obtained by calculating the mapping relationship between the rotation angle of the finger and the rotatable tray.

According to the embodiments of the present disclosure, the method further comprises: identifying a visitor using a second camera; calculating a distance between the visitor and the display cabinet using a microprocessor; if the distance between the visitor and the display cabinet is less than or equal to a predetermined distance, controlling, by the microprocessor, the transparent touch display screen to be in an awake state, and otherwise controlling, by the microprocessor, the transparent touch display screen to be in a sleep state. Therefore, the display cabinet can automatically identify the viewers who want to view the exhibit, and quickly wake up the transparent touch display screen, so that not only can the visitors be attracted, but also they do not need to go to the display cabinet to manually wake up the display screen, thereby shortening the time for the visitors to view the exhibit. If nobody is viewing the exhibit, the microprocessor determines that the distance between the visitor and the display cabinet is greater than the predetermined distance through calculation, the transparent touch display screen enters the sleep state, thereby reducing the energy consumption of the display cabinet and extending the service life of the display screen.

According to the embodiments of the present disclosure, the method further comprises: calculating a period during which human eyes gaze at the display cabinet by using the microprocessor; if the distance between the visitor and the display cabinet is less than or equal to the predetermined distance, and the period during which the human eyes gaze at the display cabinet is greater than or equal to the predetermined period, controlling, by the microprocessor, the transparent touch display screen to be in the awake state, otherwise controlling, by the microprocessor, the transparent touch display screen to be in the sleep state. Thereby, the display cabinet can more accurately identify the viewers who want to view the exhibit.

According to the embodiments of the present disclosure, by the capturing of the second camera, the microprocessor may have a function of recording visitor information, such as a number of visitors, a ratio of male to female, a length of time of attention to the exhibit, or the like, and transmitting the recorded visitor information to the server for data analysis and providing big data analysis for managers.

According to the embodiments of the present disclosure, in order to better control the capturing of the second camera, the second camera is also controlled by the controller to perform corresponding operations. Specifically, the second camera is controlled by the system board of the controller to capture the viewer and realize the function of viewer recognition.

According to the embodiments of the present disclosure, the above method is applicable to controlling the display cabinet as described above, wherein the design requirements for the first camera, the rotatable tray, the transparent touch display screen, the light source, the controller, the second camera, the predetermined period, the predetermined distance or the like are the same as those described previously, and will not be repeated herein.

In the description of this specification, reference throughout this specification to "one embodiment", "some embodiments", "examples", "specific examples", or "some examples" means that a particular feature, structure, material or characteristic described in connection with the embodiment is included in at least one embodiment of the present application. Therefore, illustrative references to the above terms are not necessarily all referring to the same embodiment or example. Furthermore, the particular feature, structure, material or characteristic may be combined as suitable in one or more embodiments of the disclosure. In addition, those skilled in the art may combine the different embodiments or examples described in this specification and features of different embodiments or examples without conflicting with each other.

Although embodiments of the present disclosure have been illustrated and described above, it will be understood that the above-described embodiments are exemplary and not to be construed as limiting the present disclosure. Those skilled in the art may make variations, modifications, substitutions, and variations to the above described embodiments within the scope of the present disclosure.

What is claimed is:

1. A display cabinet comprising a cabinet body which defines an exhibition space, the display cabinet comprising: a rotatable tray arranged in the exhibition space, which is configured to place an exhibit; a first camera located in the exhibition space, which is configured to capture images of the exhibit at different angles to construct a 3D model of the exhibit; and a transparent touch display screen constituting at least a portion of the cabinet body, which is configured to display the 3D model when the transparent touch display screen is in an awake state, and acquiring a touch operation and displaying a detailed information of the exhibit according to the touch operation; a method of controlling the display cabinet comprising: displaying a 3D model of an exhibit when a transparent touch display screen is in an awake state, and acquiring a touch operation through the transparent touch display screen and displaying a detailed information of the exhibit according to the touch operation, wherein when the touch operation is a rotation touch operation, the controller controls the rotatable tray to rotate a corresponding angle according to a mapping relationship between the rotation touch operation and the rotatable tray.

2. The display cabinet according to claim 1, further comprising:
   a second camera arranged on the cabinet body;
   a microprocessor electrically connected to the second camera and the transparent touch display screen;

wherein the second camera is configured to identify a visitor, and the microprocessor is configured to calculate a distance between the visitor and the display cabinet; if the distance between the visitor and the display cabinet is less than or equal to a predetermined distance, the microprocessor controls the transparent touch display screen to be in the awake state; otherwise the microprocessor controls the transparent touch display screen to be in a sleep state.

3. The display cabinet according to claim 2, wherein the microprocessor is further configured to calculate a period during which human eyes gaze at the display cabinet; if the distance between the visitor and the display cabinet is less than or equal to the predetermined distance, and the period during which the human eyes gaze at the display cabinet is greater than or equal to a predetermined period, the microprocessor controls the transparent touch display screen to be in the awake state; otherwise the microprocessor controls the transparent touch display screen to be in the sleep state.

4. The display cabinet according to claim 3, wherein the predetermined distance is 1 to 1.5 meters, and the predetermined period is 3 to 5 seconds.

5. The display cabinet according to claim 2, further comprising a controller which is configured to control the rotatable tray, the first camera, the transparent touch display screen and the second camera to perform respective operations according to the touch operation,
wherein the controller is configured to control the rotatable tray to rotate a corresponding angle according to a mapping relationship between a rotation touch operation and the rotatable tray when the touch operation is the rotation touch operation.

6. The display cabinet according to claim 5, wherein the controller comprises:
a system board which runs an operating system and has an application installed thereon, the application configured to control the transparent touch display screen to display the detailed information of the exhibit and/or controlling a rotation angle of the rotatable tray according to the touch operation.

7. The display cabinet according to claim 1, further comprising a storage space arranged on a side of the rotatable tray away from the exhibit, the storage space being provided with a stepping motor and a micro-control unit, wherein the stepping motor is configured to drive the rotatable tray to rotate, and the micro-control unit is electrically connected to the stepping motor, which is configured to control a rotation angle of the rotatable tray.

8. The display cabinet according to claim 7, further comprising an angular velocity sensor arranged on a side of the rotatable tray away from the exhibit, which is configured to monitor the rotation angle of the rotatable tray.

9. The display cabinet according to claim 1, wherein the images of the exhibit at different angles captured by the first camera are transmitted to a server which is configured to construct the 3D model according to the images of the exhibit at different angles.

10. The method according to claim 1, wherein the method is performed by a controller; if it is selected through the transparent touch display screen to model the exhibit, the controller controls the rotatable tray to rotate a circle while it controls the first camera to capture the images of the exhibit every a predetermined rotation angle; a system board of the controller transmits the images of the exhibit at different angles captured by the first camera to the server; the server constructs the 3D model of the exhibit according to the obtained images of the exhibit at different angles, and transmits the 3D model to the system board of the controller; the system board controls the transparent touch display screen to display the 3D model.

11. The method according to claim 1, wherein when the transparent touch display screen displays the 3D model, the method further comprises performing at least one of dragging, scaling and rotating of the 3D model by touching the transparent touch display screen.

12. The method according to claim 11, wherein when the rotating of the 3D model is performed, the controller controls the rotatable tray to rotate such that an exhibition angle of the exhibit is the same as an exhibition angle of the 3D model.

13. The method according to claim 12, further comprising: monitoring an actual rotation angle of the rotatable tray in real time using an angular velocity sensor; if the actual rotation angle is inconsistent with a theoretical angle, controlling, by the controller, the rotatable tray to rotate again until the actual rotation angle coincides with the theoretical angle.

14. The method according to claim 1, further comprising:
identifying a visitor using a second camera;
calculating a distance between the visitor and the display cabinet using a microprocessor; if the distance between the visitor and the display cabinet is less than or equal to a predetermined distance, controlling, by the microprocessor, the transparent touch display screen to be in the awake state; otherwise controlling, by the microprocessor, the transparent touch display screen to be in a sleep state.

15. The method according to claim 14, further comprising:
calculating a period during which human eyes gaze at the display cabinet; if the distance between the visitor and the display cabinet is less than or equal to the predetermined distance, and the period during which the human eyes gaze at the display cabinet is greater than or equal to a predetermined period, controlling, by the microprocessor, the transparent touch display screen to be in the awake state; otherwise controlling, by the microprocessor, the transparent touch display screen to be in the sleep state.

16. The method of claim 14, further comprising:
recording, by the microprocessor, visitor information according to capturing of the second camera, the visitor information including a number of visitors and a length of time of attention to the exhibit.

* * * * *